United States Patent Office 2,801,194
Patented July 30, 1957

2,801,194

SOLDERING FLUX COMPOSITION AND METHOD OF JOINING ALUMINUM THEREWITH

Richard L. Doerr, Niagara Falls, N. Y., assignor to Olin Mathieson Chemical Corporation, a corporation of Virginia No Drawing. Application April 14, 1953, Serial No. 348,821

15 Claims. (Cl. 148—23)

My invention relates to zinc chloride complex salts of pyrazoline hydrohalides as novel compositions of matter and their use as an ingredient of improved fluxes for the soldering of metals, particularly aluminum and its alloys.

In the formulation of fluxes for the soldering of aluminum and its alloys, it has been found advantageous to include a hydrazine salt as a reducing agent with suitable metal halides for example, tin or zinc chloride. The reaction fluxes coat the aluminum with the metals included as halides in the flux and these facilitate the formation of a bond between the aluminum and the metal to which it is being joined. The second metal may be another piece of aluminum or may be of a heavier metal such as copper or brass.

Flux compositions previously described usually are mixtures of solids or compositions having paste-like characteristics. Relatively fluid solutions of suitable components are particularly advantageous for production line soldering because of the ease of application, control of the proportion of adhering flux on dipping and draining and because they are cheaper and less wasteful of materials. Water is a particularly desirable solvent as it is inexpensive and non-flammable. Water is not a suitable solvent, however, for the heavy metal halides since they tend to hydrolyze, particularly at the elevated temperatures of soldering, forming undesirable oxides of the fluxes comprising heavy metals and aluminum. Moreover, fluxes comprising mere mixtures of metal halides often cause oxide formation instead of the desirable film of the metal on the aluminum.

I have discovered that pyrazoline hydrohalides have special value as fluxes for aluminum soldering operations as disclosed in my pending application Serial No. 438,823, filed April 14, 1953. I have now discovered that a pyrazoline hydrohalide can be reacted with zinc chloride or zinc dihydrazine chloride can be reacted with a ketone or an aldehyde and a hydrogen halide to produce a zinc chloride complex salt of a pyrazoline hydrohalide that is a water-soluble composition which has special utility in aluminum soldering operations. I have found that a composition comprising the zinc chloride complex salt and a nitrogen salt component comprising an ammonium halide or a hydrazine hydrohalide or mixtures thereof is a water-soluble flux composition that is easily prepared and because of its water-solubility is especially advantageous for production line soldering of aluminum. For example, concentrated solutions may be applied by spraying, dipping and the like. Similarly, the residues from the use of the compositions may be readily removed by a hot water wash. My flux compositions can be advantageously used in inexpensive non-flammable aqueous solution without the occurrence of hydrolysis of the metal halide and oxide formation as the zinc chloride in the complex does not react with water even at high temperatures. Moreover, an even film of zinc metal is provided on the aluminum surface and fluidity is improved at soldering temperatures. The compositions may be used with conventional aluminum solders, such as zinc-tin solders, and provides seals and joints of excellent strength.

The zinc chloride complex of my invention may be prepared in several ways. The zinc chloride may be reacted with a pyrazoline hydrohalide, formed by the reaction of aldehydes or ketones and hydrazine hydrohalides or by the reaction of aldehydes or ketones and hydrazine followed by reaction with a hydrogen halide, to produce the complex salt. Alternatively, the zinc chloride, aldehydes or ketones and hydrazine hydrohalides may be reacted together in any order. The zinc chloride complex may also be prepared by the reaction of zinc dihydrazine chloride, a ketone or an aldehyde and a hydrogen halide. For example, zinc dihydrazine chloride is treated with excess acetone and additionally with hydrochloric acid. The reaction proceeds readily and is exothermic. The same complex compound of approximately the same melting point and analytical properties is obtained by any of the described methods.

The pyrazoline hydrohalides useful in preparing the zinc chloride complex are advantageously obtained by the reaction of an aldehyde or a ketone with hydrazine and hydrogen halide. The pyrazoline hydrohalides may be formed by separately reacting the aldehyde or ketone with hydrazine followed by reaction with the selected hydrogen halide or they may be formed by reacting the aldehyde or ketone with the hydrazine monohydrohalide. Substituted hydrazines and hydrazine hydrohalides may be employed. For example, dimethyl hydrazine, phenyl hydrazine, hydroxy ethyl hydrazine or the hydrohalides thereof may be employed. The useful hydrogen halides include hydrogen fluoride, hydrogen bromide and hydrogen chloride, but I prefer compositions based upon hydrogen chloride. Suitable aldehydes and ketones that may be used to produce the pyrazoline hydrohalides are those containing at least one alpha hydrogen. At least one alpha hydrogen must be present in the carbonyl compound in order to effect ring closure to form the pyrazoline. For best results in application of the zinc chloride complex as a flux for aluminum soldering operations the nature of the organic radical should be selected to avoid excessive carbonization during the soldering operation. Thus aldehydes or ketones of good thermal stability provide suitable starting materials in the preparation of useful soldering fluxes.

I have found that pyrazoline hydrohalides prepared from ketones have particular value when reacted with zinc chloride as fluxes in aluminum soldering. The pyrazoline prepared from acetone, e. g. 3,5,5 trimethyl pyrazoline hydrohalide, is particularly advantageous, but pyrazolines prepared from other lower aliphatic ketones such as methyl-ethyl ketone, di-acetone alcohol, di-ethyl ketone and methyl iso-butyl ketone are also useful. In addition, methyl vinyl ketone, aldol, mesityl oxide and methyl phenyl ketone can be employed in producing pyrazoline hydrohalides which have value. Among the aldehydes, acetaldehyde, propionaldehyde, butyraldehyde, acrolein and crotonaldehyde may be employed.

In the preparation of the pyrazoline compounds, when saturated carbonyl compounds are used, preferably two moles or more of the aldehyde or ketones may be reacted with one mole of the hydrazine monohydrohalide by admixture at ordinary temperatures or with application of controlled heat. When certain unsaturated aldehydes or ketones, such as acrolein or crotonaldehyde, are used, one mole of the aldehyde or ketone is reacted with one mole of the hydrazine monohydrohalide. In the case of viscous or solid materials, an inert solvent is employed. The product may be recovered in the usual way by crystallization and filtration from the excess aldehyde or ketone or the reaction medium. Alternatively, the aldehyde or ketone may be reacted with hydrazine, either as a solution of the hydrate or in the anhydrous state, and the resulting reaction mixture is further reacted with aqueous or gaseous hydrogen halide. Again the reacting proportions are two moles or more of the saturated aldehyde or ketone, or one mole of the unsaturated, for each mole of hydrazine to be reacted and one mole of the hydrogen halide. The compounds prepared from the aldehyde or ketone, hydrazine and hydrogen halide are advantageously recrystallized from methanol or other suitable solvent in order to obtain a purified product.

In the reaction of zinc chloride, a ketone or an aldehyde and a hydrazine hydrohalide, of the types described above, the zinc chloride complex is easily prepared by mixing the reactants in any order. The reaction is spontaneous and exothermic and advantageously provision is made for the dissipation of the heat of reaction. Advantageously, the ketone or aldehyde may be added at a suitable rate to a mixture of zinc chloride and a hydrazine hydrohalide under reflux in order to avoid loss of ketone or aldehyde. Suitable proportions are about 2 moles of ketone or aldehyde to 1 mole of hydrazine hydrohalide. From about 0.5 to 1 mole of zinc chloride is used per mole of hydrazine hydrohalide. Water may be added to the reaction mixture to control the heat of reaction. Alternatively, the hydrazine hydrohalide and zinc chloride in aqueous solution may be added to the ketone or aldehyde. For example, an aqueous solution of 20 moles of hydrazine hydrochloride and 10 moles of zinc chloride in 1.33 kg. of water was added to 40 moles of acetone under reflux. From the resulting solution, a crystalline product was obtained having a melting point of 147°–151° C. Elementary analysis for all of the elements present corresponds to the theoretical for a complex of 2 moles of 3,5,5 trimethyl pyrazoline monohydrochloride and 1 mole of zinc chloride having the formula:

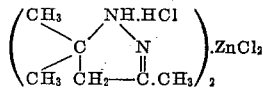

The zinc chloride complex advantageously may be dissolved in water or water may be present in the reaction mixture and the resulting aqueous solution used to formulate the aqueous solutions used as fluxes according to the present invention.

The flux compositions of my invention are obtained by adding a nitrogen salt component to the zinc chloride complex in aqueous solution. The nitrogen salt component may amount to 10 to 50 percent of the weight of the zinc chloride complex. The nitrogen salt component comprises an ammonium halide or a hydrazine hydrohalide or mixtures thereof. Ammonium chloride and hydrazine hydrochloride are preferred although the bromides are also useful. The nitrogen salt component may comprise from about 50 to 90 percent of an ammonium halide, for example ammonium chloride, and the balance hydrazine hydrohalide, for example hydrazine hydrochloride. The hydrazine salt proportion should be at least about 10 percent as less advantageous results are obtained when the hydrazine salt proportion falls below this amount. Although the hydrazine salt or ammonium halide may comprise all of the nitrogen salt component, the use of the hydrazine salt alone is costly and it is therefore desirable to include ammonium halide in the component. It is thus advantageous for the nitrogen salt component to comprise at least 10 percent of hydrazine hydrohalide and the balance ammonium halide. Particularly advantageous results are obtained when the nitrogen salt component comprises, for example, about 80 percent ammonium chloride and 20 percent hydrazine hydrochloride.

My invention thus provides an improvement in the method of soldering aluminum and also other metals, such as copper or brass. According to my invention, a solution, preferably an aqueous solution, of the flux compositions is applied to the metal surface to be soldered. During the soldering operation the temperature and time should be controlled to prevent excessive charring and formation of difficult-to-remove carbonaceous flux residues. For example, it is advisable to limit the soldering temperature to about 450° C. and the soldering time to a period of about 1 to 2 minutes. The soldering residues are readily removed from the metal by washing with hot water. Although more dilute solutions may be used it is advantageous to use the minimum proportion of water necessary to dissolve the components of the flux composition and solutions containing 50 percent or more of solids may be prepared. Solvents other than water may be used, for example lower aliphatic monohydric alcohols, e. g. methanol, ethanol, isopropanol, or lower aliphatic dihydric alcohols, e. g. ethylene glycol, propylene glycol, butylene glycol, or lower aliphatic ketones, e. g. acetone, but are less advantageous because of the greater expense, increased fire hazard and the problem of solvent recovery. The method of application may be by spraying, painting, dipping or other suitable means. The flux compositions have particular value in the soldering of aluminum and its alloys, as well as aluminum and its alloys with copper or brass, in connection with commercial zinc-tin solders.

The zinc chloride complex and flux compositions of my invention and their usefulness in the soldering of metals will be further illustrated by the following examples:

Example I

The zinc chloride complex of my invention was prepared by adding slowly an aqueous solution of 1.36 kg. of zinc chloride and 1.37 kg. of hydrazine monohydrochloride in 1.33 kg. of water to 2.32 kg. of acetone. Reaction began immediately and the rate of addition was adjusted to maintain the acetone at refluxing temperature. The reaction was complete without additional heat.

A flux composition was prepared containing 50 percent solids by mixing 3000 parts of the complex, 60 parts of additional hydrazine hydrochloride, 300 parts of ammonium chloride and a total of 3360 parts of water.

Example II

To a solution of 1 mole of zinc chloride and 1 mole of hydrazine monohydrochloride dissolved in water was added acetone in the proportion of 2 moles per mole of hydrazine monohydrochloride. 2 moles of ammonium chloride were added and the composite solution gave excellent fluxing action on aluminum with substantially no charring of the residue which could be easily washed off with hot water.

Example III

The effect of varying amounts of ammonium chloride and hydrazine hydrochloride on carbonization and fluxing action of the zinc chloride complex was determined by adding one-gram portions of ammonium chloride or hydrazine hydrochloride to 100 ml. of a 50 percent aqueous solution of the complex and making soldering tests after each addition.

The soldering test was made by placing approximately 0.2 gram of 50–50 zinc-tin solder on a 1.5 x 1.5 x 1/32 inch piece of aluminum and heating on a hot plate at 400° to 450° C. until the solder melted and ceased spreading. The process requires about one minute. The cooled test piece was judged by the area covered by the solder and by the amount of flux residue.

Improved flux action and less carbonization was observed as ammonium chloride was added to the 50 percent solution of the complex until about 5 to 6 one-gram portions had been added. More appeared to have little effect.

One to two grams of hydrazine hydrochloride added to the 50 percent solution of complex appeared to show maximum effect.

By combining one to two grams of hydrazine hydrochloride with ten grams of ammonium chloride in 100 ml. of a 50 percent aqueous solution of the complex, visibly improved flux action with minimum carbonization was obtained.

*Example IV*

The zinc chloride complex was prepared as described in the first paragraph of Example I. A flux composition was prepared by adding to the solution of the complex 3 liters of water and additional ammonium chloride and hydrazine hydrochloride to provide a solution containing 100 grams per liter of ammonium chloride and 20 grams per liter of hydrazine hydrochloride.

On a square of aluminum, 1.5 x 1.5 x 1/32 inch, was placed approximately 0.2 gram of a 30 percent tin-70 percent zinc solder, 5 drops of the flux and a piece of aluminum 1.5 x 0.25 x 1/32 inch, bent in the shape of a C standing on its side in contact with the flux and solder. The assembly was placed on a hot plate at 400°–450° C. and heated until the evolution of white fumes ceased. The solder spread by capillary action and completely filled the seam between the two pieces of aluminum. On cooling, a strong solder bond was found to join the two pieces of metal. A small amount of flux residue remained which was easily removed by washing with hot water.

*Example V*

The procedure of Example IV was repeated using a C of brass and a square of aluminum. A strong solder bond was similarly formed.

I claim:

1. A zinc chloride complex salt of a pyrazoline hydrohalide in which the pyrazoline is selected from the group consisting of pyrazoline and pyrazolines substituted with at least one substituent selected from the group consisting of lower alkyl substituents containing not more than 4 carbon atoms and phenyl substituents.

2. A zinc chloride complex salt of a pyrazoline monohydrochloride in which the pyrazoline is selected from the group consisting of pyrazoline and pyrazolines substituted with at least one substituent selected from the group consisting of lower alkyl substituents containing not more than 4 carbon atoms and phenyl substituents.

3. A zinc chloride complex salt of a pyrazoline monohydrobromide in which the pyrazoline is selected from the group consisting of pyrazoline and pyrazolines substituted with at least one substituent selected from the group consisting of lower alkyl substituents containing not more than 4 carbon atoms and phenyl substituents.

4. A zinc chloride complex salt of 3,5,5 trimethyl-pyrazoline monohydrochloride.

5. A soldering flux composition consisting essentially of a zinc chloride complex salt of a pyrazoline hydrohalide, in which the pyrazoline is selected from the group consisting of pyrazoline and pyrazolines substituted with at least one substituent selected from the group consisting of lower alkyl substituents containing not more than 4 carbon atoms and phenyl substituents, and about 10 to 50 weight percent, based on the zinc chloride complex salt, of a nitrogen salt component selected from the group consisting of an ammonium halide, a hydrazine hydrohalide and mixtures thereof, said zinc chloride complex salt being present in a proportion effective to provide fluxing activity.

6. A zinc chloride complex salt of 3,5,5-trimethyl pyrazoline monohydrobromide.

7. The composition of claim 5 in which the pyrazoline hydrohalide is 3,5,5-trimethyl pyrazoline monohydrochloride and the nitrogen salt component is hydrazine hydrochloride and ammonium chloride.

8. The composition of claim 7 in a water carrier.

9. The composition of claim 5 in which the pyrazoline hydrohalide is 3,5,5-trimethyl pyrazoline monohydrobromide and the nitrogen salt component is hydrazine hydrobromide and ammonium chloride.

10. The composition of claim 9 in a water carrier.

11. In the joining of aluminum, aluminum alloy, copper and brass metals by solder wherein a flux is used, the step of applying to the said metals to be joined a flux composition consisting essentially of a zinc chloride complex salt of a pyrazoline hydrohalide, in which the pyrazoline is selected from the group consisting of pyrazoline and pyrazolines substituted with at least one substituent selected from the group consisting of lower alkyl substituents containing not more than 4 carbon atoms and phenyl substituents, and about 10 to 50 weight percent, base don the zinc chloride complex salt, of a nitrogen salt component selected from the group consisting of an ammonium halide, a hydrazine hydrohalide and mixtures thereof, said zinc chloride complex salt being present in an amount effective to provide fluxing activity, in a carrier selected from the group consisting of water, lower aliphatic monohydric and dihydric alcohols and lower alphatic ketones, said alcohols and ketones containing not more than 4 carbon atoms.

12. The method of claim 11 in which the pyrazoline hydrohalide is 3,5,5-trimethyl pyrazoline monohydrochloride and the nitrogen salt component is hydrazine hydrochloride and ammonium chloride.

13. The method of claim 12 in which the composition is in a water carrier.

14. The method of claim 11 in which the pyrazoline hydrohalide is 3,5,5-trimethyl pyrazoline monohydrobromide and the nitrogen salt component is hydrazine hydrobromide and ammonium chloride.

15. The method of claim 14 in which the composition is in a water carrier.

References Cited in the file of this patent

UNITED STATES PATENTS

| | | |
|---|---|---|
| 1,882,734 | Barber | Oct. 18, 1932 |
| 2,155,307 | Hagemann | Apr. 18, 1939 |
| 2,581,905 | Carr | Jan. 8, 1952 |
| 2,612,459 | Willard et al. | Sept. 30, 1952 |
| 2,640,793 | Doerr | June 2, 1953 |

OTHER REFERENCES

"Chemical Abstracts," vol. 44, page 1055i. Published by the American Chemical Society.